United States Patent [19]

Davis et al.

[11] 4,041,981
[45] Aug. 16, 1977

[54] EJECTOR ASSEMBLY

[75] Inventors: James W. Davis, New Britain; Garrett H. Hilton, Hatboro, both of Pa.

[73] Assignee: Fischer & Porter Co., Warminster, Pa.

[21] Appl. No.: 681,200

[22] Filed: Apr. 28, 1976

[51] Int. Cl.² ............................................. F16K 19/00
[52] U.S. Cl. .................................. 137/604; 261/78 A; 261/DIG. 75; 417/198
[58] Field of Search .................. 137/604; 210/169; 259/4 R; 261/78 A, DIG. 75; 417/198

[56] References Cited

U.S. PATENT DOCUMENTS

| 1,027,321 | 5/1912 | Cleveland | 417/198 X |
| 1,177,947 | 4/1916 | Hangliter | 417/198 X |
| 3,042,071 | 7/1962 | Van Tuyl | 137/604 X |
| 3,110,320 | 11/1963 | Rosenberger | 137/604 X |
| 3,220,430 | 11/1965 | Hasket | 137/604 X |

FOREIGN PATENT DOCUMENTS 253,755  6/1968  U.S.S.R. ................. 261/DIG. 75

Primary Examiner—Robert G. Nilson

[57] ABSTRACT

An ejector assembly adapted to intermingle a gas, such as chlorine, with process liquid or water to form a solution which is discharged from the assembly. Included in the assembly is an ejector body within which is disposed a nozzle whose output is spaced from the inlet of a throat to define an interaction zone which communicates with a gas supply. Liquid under pressure is fed into the nozzle and is forced thereby at high velocity into the interaction zone to create a vacuum acting to draw gas from the gas supply. The gas interacts with the liquid to form a solution that is discharged via the throat through suitable piping to a point of application. Coaxially disposed within the contoured bore of the nozzle is a plug which defines an annular liquid flow path, the plug having an enlarged flange thereon which cooperates with the contoured bore to form alternate restrictions and expansions in the flow path that render the liquid highly turbulent and produce cavitation, thereby enhancing the interaction of liquid and gas in the interaction zone to provide a higher vacuum level of operation to permit critical flow control at no additional cost.

6 Claims, 3 Drawing Figures

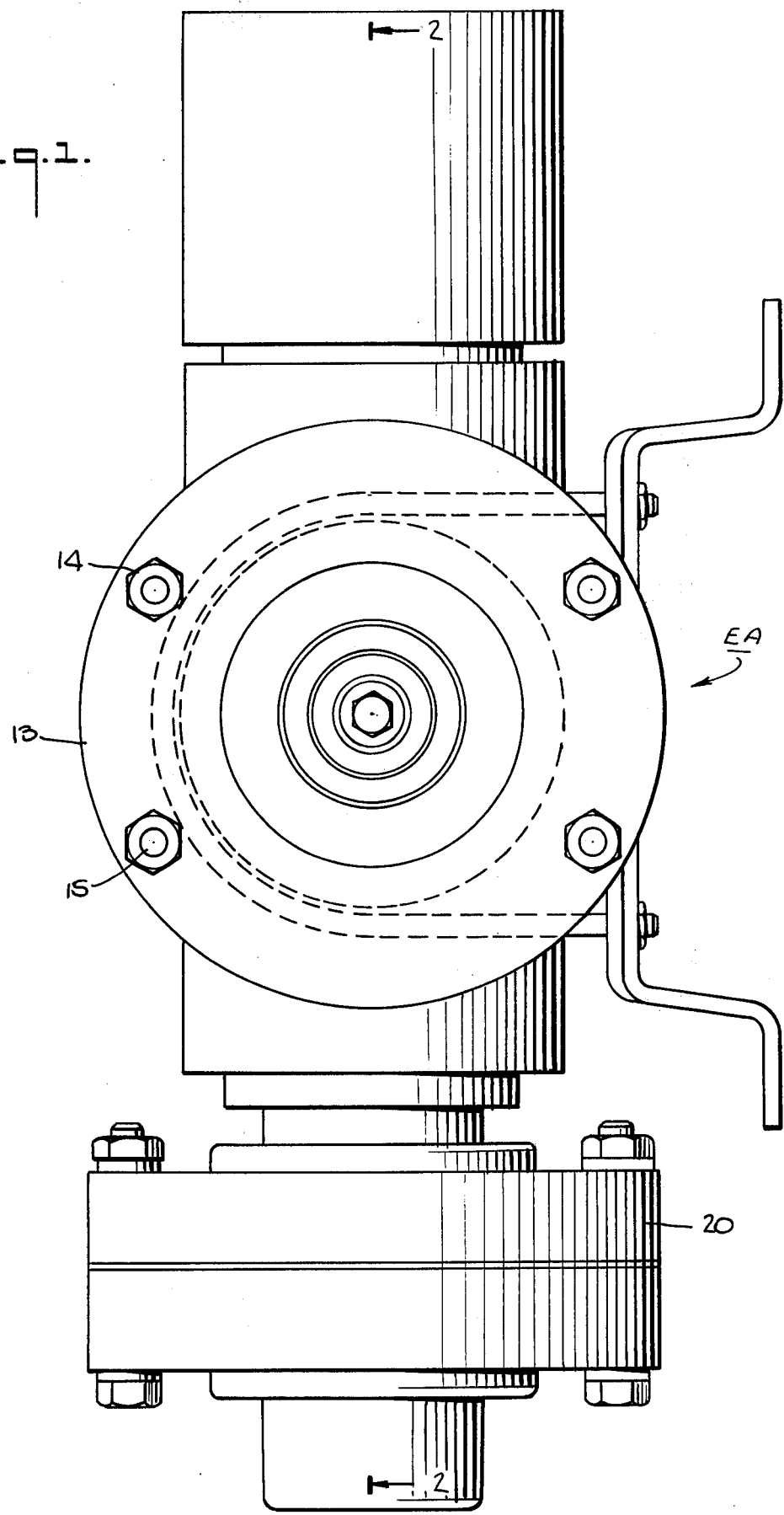

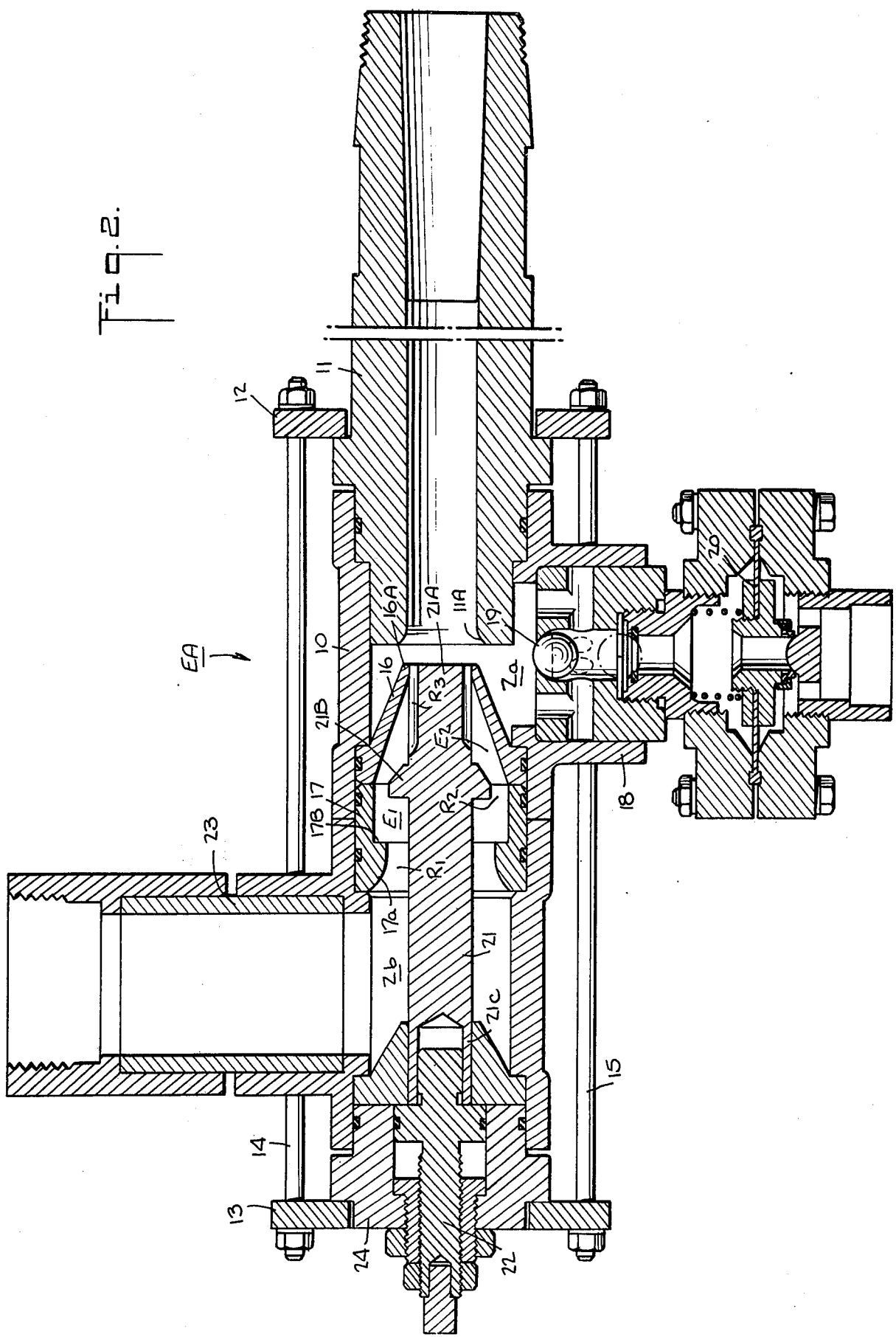

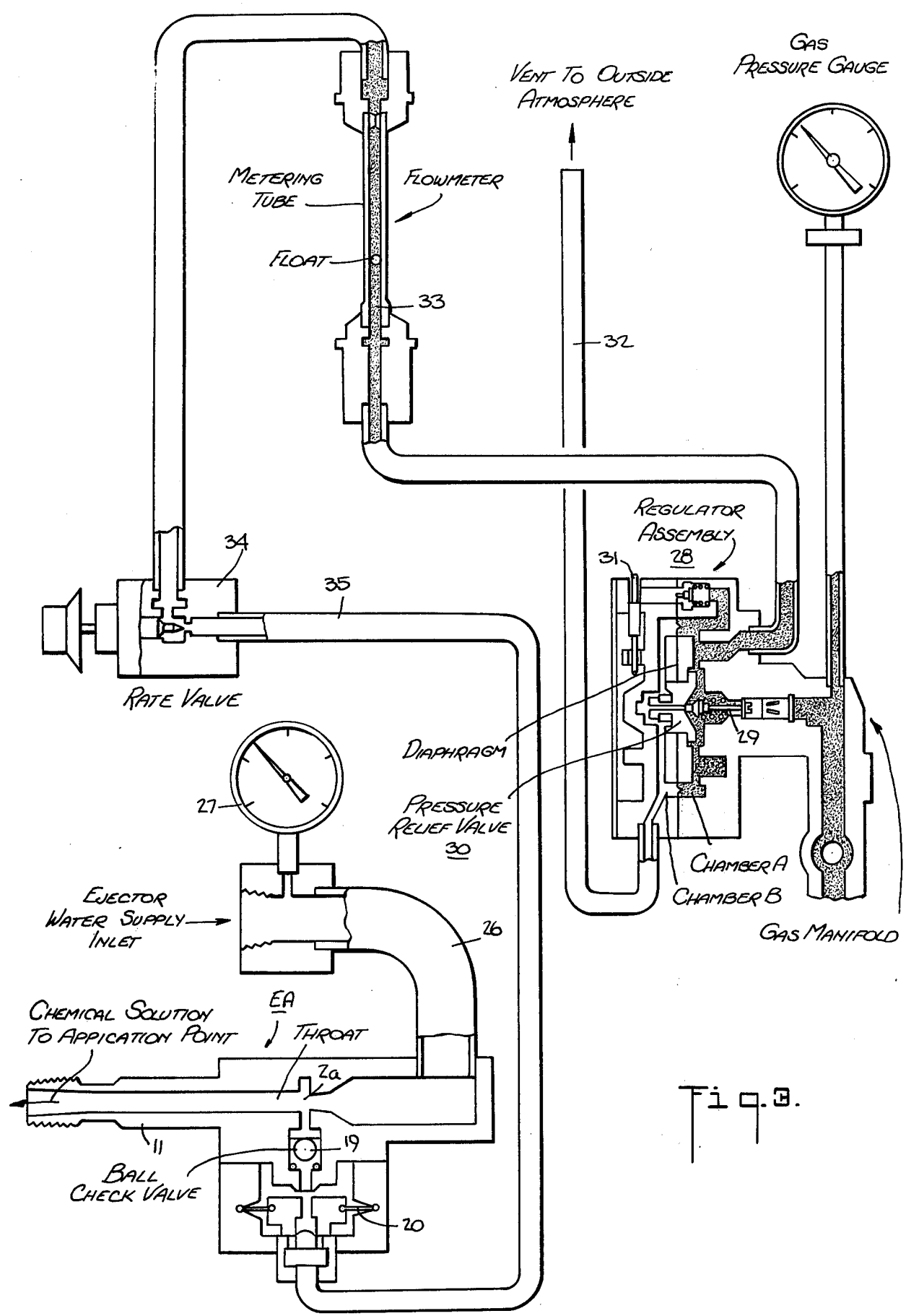

EJECTOR ASSEMBLY

BACKGROUND OF INVENTION

This invention relates to a fixed orifice ejector assembly adapted to intermingle gas with a process liquid or water to form a solution that is discharged from the assembly, and particularly to an assembly which promotes liquid turbulence and thereby enhances the interaction between the gas and the liquid, and in turn creates a higher vacuum level (greater available energy to operate the system) with the lowest possible energy loss across the ejector.

In order to introduce a gas such as chlorine or ammonia into a process liquid or water, it is known to provide a solution feed gas dispenser for this purpose. A typical commercially-available solution feed gas dispenser is the Series 70-1750 apparatus manufactured by Fischer & Porter Co. of Warminster, Pennsylvania. This dispenser is described in the Fischer & Porter Instruction Bulletin (Pub. No. 17234).

In a conventional gas dispenser such as the Fischer & Porter apparatus, water or process liquid is forced under pressure through the nozzle of an ejector assembly. As the water passes therethrough, a vacuum is created in the immediate downstream side of the nozzle by the high velocity of the emitted water. This vacuum acts to withdraw a back-flow ball check valve in the assembly from its seat to permit gas to enter the assembly in an interaction zone between the nozzle output and a throat. In this zone, the gas is mixed with the turbulent water issuing from the nozzle to form a chemical solution which is discharged via the throat through the solution piping to a point of application.

The operating efficiency of an ejector assembly can be measured by the amount of gas flow it can handle, at a defined vacuum level, for a given set of hydraulic parameters. In the case, for example, of a chlorinating system for water purification, it is desirable that water discharged from the ejector have as high a chlorine concentration as possible with respect to the operating vacuum level and the hydraulic parameters. The extent to which the incoming gas intermingles in the interaction zone with the liquid issuing from the nozzle of the ejector assembly is a function of the controlled turbulence of the liquid. The more turbulent the liquid within geometric confines, the larger is the surface area of the liquid in contact with the gas and thus the greater amount of gas dissolved for any given quantity of liquid.

While existing types of ejector assemblies, such as the fixed orifice ejector series 71J1100, manufactured by Fischer & Porter Co. and described in their Instruction Bulletin (Pub. No. 13952), include nozzles designed to produce liquid turbulence, these nozzles and the liquid input thereto do not create the degree of controlled turbulence as does this design which gives rise to a much higher order of ejector efficiency.

SUMMARY OF INVENTION

In view of the foregoing, the main object of this invention is to provide a fixed orifice ejector assembly which promotes controlled liquid turbulence and thereby enhances the interaction between the gas and liquid, which, in turn, creates a higher operating vacuum level for a given gas flow and given hydraulic conditions than would conventional ejectors. Thus, for the same gas flow rate and essentially the same water flows, this ejector creates sufficient vacuum to permit the use of the critical flow principle to control gas flow.

More particularly, it is an object of this invention to provide a fixed orifice ejector assembly whose nozzle bore is contoured to cooperate with a coaxially disposed plug to create an annular nozzle flow path having alternate restrictions and expansions whereby the liquid emerging from the nozzle is characterized by a high degree of turbulence and cavitation.

Also an object of the invention is to provide an efficient ejector assembly of relatively simple design which may be manufactured at low cost.

Briefly stated, these objects are attained in an assembly having an ejector body within which is disposed a nozzle whose output is spaced from the inlet of a throat to define an interaction zone that communicates through at least one back-flow check valve to a gas supply.

Liquid under pressure is fed into the nozzle and is forced thereby at high velocity into the interaction zone to create a vacuum acting to open the check valve and draw gas into the zone where it interacts with the liquid to form a solution that is discharged via the throat through suitable piping to a point of application.

The bore of the nozzle is contoured to cooperate with an enlarged flange formed on a plug coaxially disposed within the nozzle to define an annular liquid flow path therein having alternate flow restrictions and expansions to render the liquid highly turbulent and to produce cavitation, thereby enhancing the interaction of liquid and gas in the interaction zone resulting in a higher vacuum operating level while providing the saturated solution at no additional expense of the liquid flowing.

OUTLINE OF DRAWING

For a better understanding of the invention as well as other objects and further features thereof, reference is made to the following detailed description to be read in conjunction with the accompanying drawing, wherein:

FIG. 1 is an end view of an ejector assembly in accordance with the invention;

FIG. 2 is a section taken in the plane indicated by line 2—2 in FIG. 1;

FIG. 3 schematically discloses the ejector assembly as a functioning element in a solution feed gas dispenser.

DESCRIPTION OF INVENTION

The Ejector Assembly:

Referring now to FIGS. 1 and 2, an ejector assembly in accordance with the invention, generally designated as EA, is provided with a cylindrical ejector body 10. Removably attached to the body and extending axially therefrom is a tubular throat 11, the attachment being effected by means including front and rear retainer rings 12 and 13 and interconnecting studs 14 and 15.

Mounted within the bore of body 10 is a nozzle formed by a tapered nozzle head 16 and a contiguous spacer 17, the nozzle head and spacer being provided with "O" rings which engage the internal wall of the ejector body to effect a seal therebetween. The nose 16A of the nozzle head is adjacent the chamfered inlet 11A of throat 11, the spacing therebetween defining an interaction zone $Z_a$.

Disposed within a lateral stub pipe 18 integral with body 10 is a back-flow ball check valve 19, pipe 18 communicating with zone $Z_a$. Incoming gas is fed to the ejector assembly through the inlet of a valve 20 which is coupled to the input of ball check valve 19, so that in order for the gas to be admitted into interaction zone $Z_a$, both valves must be caused to open.

Water under pressure is fed into ejector assembly EA through a nipple 23 into an input zone $Z_b$ in ejector body 10 behind nozzle spacer 17. The flow axis of the nipple is at right angles to the flow axis of the nozzle, whereby these elements define an elbow which forces the incoming water to make a sharp turn and thereby render the water more turbulent. It is to be noted that in the ejector included in the Fischer & Porter dispenser series 70-1750 and in the Fischer & Porter fixed orifice ejector 71J1100, the incoming water feed is in axial alignment with the flowpath through the nozzle of the ejector, so that no additional turbulence is created at the point of entry. (Note: By definition, the water flowing is turbulent when the flow exceeds a Reynolds number of 4,000 which is dependent on the velocity of the liquid.)

Coaxially supported within input zone $Z_b$ and the nozzle formed by nozzle head 16 and spacer 17 is a plug 21 to define therewith an annular flow path for the water passing through the nozzle. The front end 21A of plug 21 is at the mouth of nozzle head 16, and the rear end 21C thereof is axially supported by a bolt 22 held within a bushing 24 interposed between retainer ring 13 and the rear end of body 10.

The bore or water passage of the nozzle is contoured, the inlet end 17A of nozzle spacer 17 being also contoured to define with plug 21 an annular restriction $R_1$ which leads to an annular expansion chamber $E_1$ defined by a shoulder 17B in nozzle spacer 17, and an enlarged-diameter flange 21B formed on the plug at a position adjacent the junction of spacer 17 and nozzle head 16. This flange has a forward taper which is steeper than the taper of the nozzle head and also defines, with the nozzle, a second annular flow restriction $R_2$, which is followed by an expansion chamber $E_2$ and a final fluted restriction $R_3$. Thus the pressurized water into and through the nozzle includes flow discontinuities which impart a high degree of turbulence to the water, for the incoming water is first forced through a right angle elbow, then through a restriction $R_1$ and from there into an expansion chamber $E_1$. From expansion chamber $E_1$, the water flow is again confined in restriction $R_2$, and from there it enters the annular expansion chamber $E_2$, which in turn leads to the final restriction $R_3$ at the mouth of the nozzle.

These alternately-arranged restrictions and expansions in the nozzle flow path give rise to churning and cavitation, so that the water discharged from the nozzle into interaction zone $Z_a$ has an exceptionally high surface area of exposure with respect to the gas admitted into the same zone. Consequently, the gas is thoroughly intermingled with the turbulent water and interacts therewith to form a highly saturated solution which is discharged via throat 11 through the solution piping.

The Gas Dispenser

The preferred manner in which ejector assembly EA cooperates with control elements to form a solution feed gas dispenser is schematically illustrated in FIG. 3, where it will be seen that water or process liquid from a supply is fed under pressure into a water line 26 provided with a water pressure gauge 27 to the water inlet of ejector EA.

Gas from a suitable supply, such as a cylinder of chlorine, is fed to the input of a regulator assembly, generally designated by numeral 28, having a vacuum-regulator valve 29, a pressure-relief valve 30, and an out-of-gas indicator 31. Vacuum-regulator valve 29 also acts as a positive shut-off valve when the vacuum falls off on shut-down or should a major leak develop in the vacuum system. This valve action seals off the dispenser from the gas supply system.

Pressure-relief valve 30 opens, should pressure exist on the vacuum side of the dispenser, thereby venting the gas through a vent port and line 32 to the outside atmosphere. The plug of relief valve 30 is unseated in response to the movement of the diaphragm of vacuum-regulator 29 under pressure. The output of the regulator assembly is fed into a variable-area tube flowmeter 33 having a float therein and a rate valve 34 through a line 35 to the gas inlet of the ejector assembly EA.

In the ejector assembly, the incoming liquid is forced under pressure through the ejector nozzle head 16 into the interaction zone $Z_a$, creating a high vacuum therein, due to the increased velocity of the water. As a consequence, the ball and diaphragm backflow check valves both unseat, and a vacuum exists back through rate valve 34, flowmeter 33 and chamber A of vacuum regulator 28. When water flow through ejector EA is stopped as a result of blockage in the solution line or during shut-down period, the back flow check valves close to prevent water from entering the gas piping.

The vacuum in chamber A of gas regulator 28 creates a differential pressure across the diaphragm with respect to atmospheric pressure in chamber B which is coupled to vent line 32, and the resulting force overcomes the opposing force of the valve plug spring and raises the valve plug off its seat. Gas enters the chamber A and is reduced from the supply pressure to a constantly regulated vacuum by the throttling action of regulator valve 29.

This throttling action then is the equilibrium attained by the vacuum demand as regulated by rate valve 34 and the amount of gas admitted into chamber A by the valve plug to satisfy this demand. From chamber A, the gas is drawn through flowmeter 33, wherein flow rate is indicated by the position of the ball float in the calibrated and graduated meter tube.

The gas then passes into rate valve 34, and because a minimum high vacuum level is maintained downstream of the rate valve, critical gas flow occurs across the valve orifice. This gas flow rate will remain constant, therefore, at any selected setting of rate valve 34, despite pressure fluctuations in ejector assembly EA, as long as the vacuum level does not decrease below that level which will maintain critical flow across the rate valve. The gas finally enters the interaction zone $Z_a$ in ejector assembly EA where it mixes with the turbulent liquid produced therein to form a saturated solution which is fed through the throat and by piping to a point of application.

An ejector in accordance with the invention is capable of handling high gas flows in the order of 40 kgPh of $Cl_2$ gas, while sustaining a sufficiently high vacuum level to maintain critical flow regulation at the rate valve of the vacuum regulator. The ejector design is such as to minimize water consumption. Minimum water is defined as the amount required to produce a maximum ratio of 3500 ppm (by weight) of chlorine gas dissolved in water. Because of the extremely turbulent condition produced by an ejector in accordance with the invention, this ejector as compared to prior art ejectors having the same flow capabilities with essentially the same hydraulic parameters, will operate at twice the vacuum level.

Because of this greater efficiency or higher vacuum level of operation, gas flow control can be maintained constant across the rate valve (flow control valve) for any given setting by means of the critical flow principle, thereby obviating the need for a differential regulator as in prior systems, to maintain a constant $\Delta P$ across the rate valve. Thus the ejector in accordance with the invention permits the use of a single stage vacuum regulator for high gas flows.

While there has been shown and described a preferred embodiment of an ejector assembly in accordance with the invention, it will be appreciated that many changes and modifications may be made therein without, however, departing from the essential spirit thereof.

I claim:

1. An ejector assembly for intermingling a liquid with a gas to produce a solution to be fed to an application point, said assembly comprising:
   A. an ejector body having an elongated tubular throat extending axially therefrom;
   B. a nozzle disposed in a cylindrical cavity within said body, the mouth of said nozzle being adjacent the inlet of said throat to define an interaction zone therebetween, the space in said cavity behind said nozzle defining a liquid input zone;
   C. means to feed liquid under pressure into said input zone whereby liquid at high velocity is emitted from the mouth of said nozzle into the interaction zone to create a vacuum, said liquid feed means being at right angles to the longitudinal flow axis of said ejector body to define an elbow rendering the liquid input to said nozzle turbulent;
   D. means communicating with said interaction zone and coupled to a gas supply to cause gas to be drawn into said interaction zone by said vacuum to intermingle with the liquid therein and to produce said solution which is discharged through said throat; and
   E. a plug coaxially-disposed within said nozzle and said input zone to define an annular flow path having flow disturbances therein imparting a high degree of turbulence to the liquid issuing from the nozzle, thereby enhancing its interaction with said gas, the internal bore of said nozzle being contoured to cooperate with a flange of enlarged diameter formed on said plug to create alternate restrictions and expansions in said flow path through said nozzle.

2. An assembly as set forth in claim 1, wherein said nozzle is formed by a tapered nozzle head and an adjoining spacer.

3. An assembly as set forth in claim 1, wherein said means feeding gas into said interaction chamber includes backflow check valve means.

4. An assembly as set forth in claim 1, wherein said throat is removably attached to said body by front and rear retainer rings interconnected by studs.

5. An ejector assembly as set forth in claim 1, wherein said gas is chlorine.

6. An ejector assembly as set forth in claim 1, wherein said gas is ammonia.

* * * * *